United States Patent [19]

Swarup

[11] Patent Number: 5,429,654
[45] Date of Patent: Jul. 4, 1995

[54] COATED AGRICULTURAL PRODUCTS

[75] Inventor: Vijay Swarup, Edmonton, Canada

[73] Assignee: Exxon Research & Engineering Co., Florham Park, N.J.

[21] Appl. No.: 876,141

[22] Filed: Apr. 30, 1992

[51] Int. Cl.⁶ .................. C05G 3/00; C05G 5/00; C05G 9/00
[52] U.S. Cl. .................. 71/64.07; 71/64.11; 71/64.13; 71/28; 427/212
[58] Field of Search .................. 71/1, 27–30, 71/64.07, 64.11, 64.12, 64.13; 427/212

[56] References Cited

U.S. PATENT DOCUMENTS

| | | | |
|---|---|---|---|
| 3,642,728 | 2/1972 | Canter | 260/79.3 |
| 3,887,530 | 6/1975 | O'Farrell et al. | 260/79 |
| 4,988,377 | 1/1991 | Manalastas et al. | 71/28 |

FOREIGN PATENT DOCUMENTS 8706575 11/1987 WIPO.

*Primary Examiner*—Ferris Lander
*Attorney, Agent, or Firm*—Joseph J. Dvorak

[57] ABSTRACT

In one embodiment of the present invention, there is provided an improved controlled release fertilizer comprising a fertilizer coated with a neutralized, sulfonated EPDM polymer having from about 2% to about 50% crystallinity. Preferably, the coated fertilizer has a coating thickness of from about 1 to about 100 micrometers.

9 Claims, 1 Drawing Sheet

COATED AGRICULTURAL PRODUCTS

FIELD OF THE INVENTION

The present invention relates to improvements in coated agricultural products, such as controlled release fertilizers.

DESCRIPTION OF THE PRIOR ART

Elastomeric, sulfonated ionomers, such as sulfonated ethylene-propylene-diene (EPDM) terpolymers have been shown to be useful coating materials for fertilizers because of their water barrier properties, their elasticity and ability to be applied as thin continuous coatings free of pinholes. In this regard, see, for example, U.S. Pat. No. 4,988,377, which discloses the use of sulfonated elastomers as coating materials for agricultural substrates.

Although elastomeric, sulfonated EPDM materials have been successfully used for preparing slow release fertilizers, there remains a need to provide slow release fertilizers that are capable of releasing their nutrients over even longer periods of time, for example, up to about six months at temperatures in the range of about 38° C.

SUMMARY OF THE INVENTION

Surprisingly, it has now been discovered that sulfonated EPDM polymers that contain a measurable degree of crystallinity are especially useful coating materials for controlled release fertilizers. Thus, in one embodiment of the present invention, there is provided an improved controlled release fertilizer comprising a fertilizer coated with a neutralized, sulfonated EPDM polymer having from about 2% to about 50% crystallinity. Preferably, the coated fertilizer has a coating thickness of from about 1 to about 100 micrometers.

DETAILED DESCRIPTION OF THE INVENTION

Figure 1:
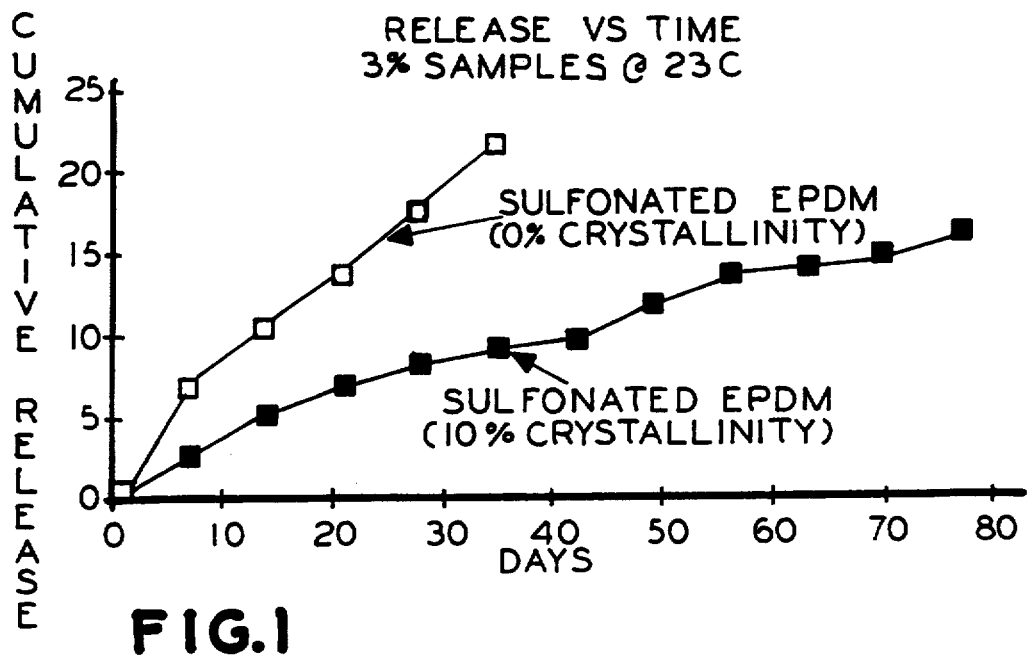
FIG. 1 is a graph comparing fertilizer release as a function of time at 23° C. for a fertilizer coated with a non-crystalline, neutralized, sulfonated EPDM and a fertilizer coated with a crystalline, neutralized, sulfonated EPDM in accordance with this invention.

As stated previously, the polymer used to form the improved composites of the present invention are neutralized, sulfonated EPDM polymers which contain a measurable degree of crystallinity and specifically from about 2% to about 50% crystallinity, as determined, for example, by x-ray diffraction at 25° C. or by differential scanning colorimetry (DSC). Preferably, the EPDM polymer will have a crystallinity of between about 3% to about 200%. As will be readily appreciated, these crystalline, neutralized, sulfonated EPDM polymers contain from about 55 wt. % to about 80 wt. % ethylene. In contrast thereto, the non-crystalline elastomeric EPDM polymers generally contain about 50 wt. % or less of ethylene, although depending upon the type of catalyst used in making the polymer, higher levels of ethylene are possible with no observable crystallinity at room temperature. In any event, the preferred EPDM polymers also contain about 2 wt. % to about 10 wt. % of a diene monomer and, preferably, between about 3 wt. % to about 7 wt. % of a diene monomer. The diene monomer typically is a nonconjugated diene such as hexadiene, dicyclopentadiene, ethylidene norbornene, methylenenorbornene, propylene norbornene and methyltetrahydroindene.

The sulfonated EPDM polymers of the instant invention will contain from about 4 to about 200 milliequivalents of pendant sulfonate groups per 100 grams of polymer and, more preferably, from about 10 to about 100 milliequivalents of pendant sulfonate groups. These pendant sulfonate groups are neutralized with metal ions from Groups IA, IIA and IIB of the Periodic Table of the Elements, such as zinc, sodium, potassium and the like, and ammonium counterions. The Periodic Table referred to is that shown on the inside cover of Lange's Handbook of Chemistry, 11th Edition, McGraw-Hill Book Company, 1973. Neutralization is achieved, for example, by contacting the acid form of the polymer with an appropriate metal hydroxide, metal acetate, metal oxide or ammonium hydroxide.

The degree of neutralization of the sulfonate groups may vary widely, but will generally be greater than about 2 mole percent up to about 100 mole percent. It is particularly preferred, however, that the degree of neutralization be substantially complete; that is, with no free acid present.

The elastomeric coatings of the instant invention are formed by applying an organic solution of the neutralized, sulfonated polymer to the substrate at ambient temperature or at temperatures in the range of about 10° C. to about 50° C. by either dip-coating, spraying or with the use of other techniques for thin spreading, such as brushing. The organic solvent system is then permitted to evaporate with or without the aid of forced drying gas, such as air or nitrogen. This step is called the drying process. The drying gas temperature can be from ambient temperature up to the boiling point of the organic solvent system. Preferably, the temperature of the drying gas is between 20° C. to 100° C. The most preferred temperature of the drying gas should be about 70° C. for fast evaporation of the organic solvent system. After drying, the thickness of the applied coating should be from about 1 micrometer to about 100 micrometers. Most preferred, the coating thickness should be about 2 to about 20 micrometers for both performance and economic reasons. On a weight basis, the coating represents about 0.6 to 6 wt. % and, preferably, about 3 wt. % of the composition.

To control the thickness of the applied coating, the solution concentration of the sulfonated polymer applied is between 0.5 wt. % to 6 wt. %. Most preferably, the concentration should be about 5 wt. %.

Normally, the solvent used to form the organic solution will be a solvent such as toluene, xylene, hexane, preferably in combination with a polar solvent such as aliphatic alcohols having from 1 to 10 carbon atoms.

Basically, a fertilizer, such as urea or other micronutrient granules, can be coated to maximize the plant uptake of the applied fertilizer through minimization of losses, including evaporation, nitrogen fixation and leaching.

The following examples will demonstrate the performance of a sulfonated polymer as a barrier coating.

COMPARATIVE EXAMPLE 1

Preparation of Sodium Neutralized Sulfonated EPDM Terpolymer

A commercially available, non-crystalline, EPDM terpolymer (Royalene 521), sold by Uniroyal Corporation, Middlebury, Connecticut, which had about 50 wt. % ethylene and about 5 wt. % ethylidene norbornene, was sulfonated with acetyl sulfate according to the procedure of U.S. Pat. No. 3,836,511 and then neutralized with sodium hydroxide, thereby providing a 10% solution of sodium sulfo-EPDM in toluene-methanol solution (97:3, wt. %: wt. %). The solution was diluted with additional toluene-methanol (97:3, wt. %: wt. %) to provide a 1.25 wt. % solution of polymer. The solution of the neutralized, sulfonated EPDM polymer was then applied to urea to provide a 3 wt. % coating on the urea.

In order to measure the barrier properties of the coated urea, the following test was conducted. Fifteen grams of coated substrate are placed in a weighed 250 ml flask. Seventy-five grams of distilled water are added and the mixture is incubated at a selected temperature (here, at 23° C. and a separate sample at 38° C.). At hourly time intervals, the water is decanted from the sample into a weighed aluminum container and placed in a 98° C. oven to dry. After drying and cooling, the aluminum contained is weighed and the gain in weight represents the amount of substrate released. To the remaining coated material, 75 grams of distilled water are added and the incubation, decanting, etc. is repeated. Repetition of the procedure produces additional data points.

Figure 2:
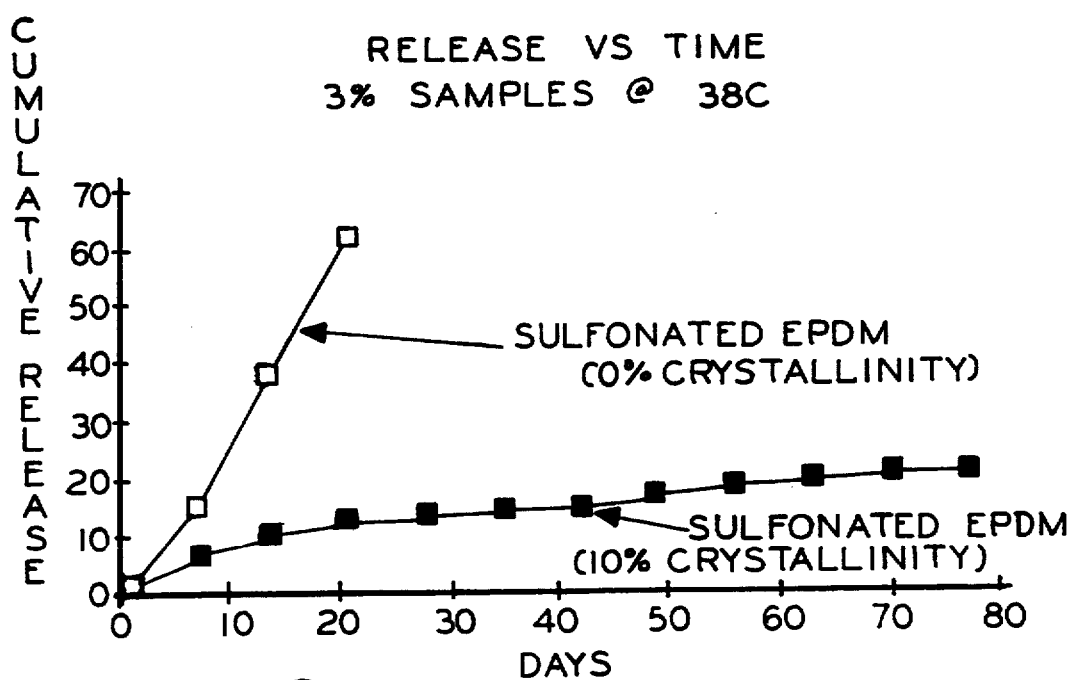
FIG. 2 is similar to FIG. 1, except that the test conditions were conducted at 38° C.

The results of these tests are set forth in FIGS. 1 and 2.

EXAMPLE 1

Following the procedure outlined above, a commercially available, crystalline, EPDM terpolymer, namely, Vistalon 7000, sold by Exxon Chemical Company, Houston, Texas, was sulfonated with acetyl sulfate, as in Comparative Example 1, and then neutralized with sodium hydroxide. The resultant 10% solution, which contained a sodium sulfo-EPDM having 25 milliequivalents of sulfonate groups per 100 grams of EPDM terpolymer in 95 wt. % toluene, 3 wt. % MeOH and 2 wt. % heptane, was diluted with the same solvent to provide a 1.25 wt. % solution, which was used to coat urea, as outlined above. The coated urea was then tested following the procedures also outlined in Comparative Example 1. The test results are plotted in FIGS. 1 and 2.

Additionally, a sample of the neutralized polymer was found to have a 10% crystallinity as determined by DSC.

From the foregoing, it can be readily appreciated that materials having measurable crystallinity are particularly suitable because of the long-term release properties of these coatings.

What is claimed is:

1. A controlled release fertilizer composition comprising: a fertilizer; and a polymer coating on the fertilizer, the polymer being a neutralized, sulfonated EPDM polymer having from 4 to about 200 milliequivalents of neutralized sulfonate groups per 100 grams of polymer and having in the range of about 2% to about 50% crystallinity.

2. The composition of claim 1 wherein the polymer coating is in the range of from about 0.6 to about 6 wt. % of the composition.

3. The composition of claim 2 wherein the sulfonate groups are neutralized with ammonium counterions.

4. The composition of claim 2 wherein the sulfonate groups are neutralized with a metal ion selected from Groups IA, IIA and IIB of the Periodic Table of the Elements.

5. The composition of claim 4 wherein the polymer has a crystallinity of from about 3% to about 15%.

6. The composition of claim 5 wherein the polymer coating is about 3 wt. % of the composition.

7. In composites having an agricultural substrate and a polymer coating on the substrate to control the release thereof under conditions of use, the improvement wherein the polymer coating comprises a neutralized, sulfonated EPDM polymer having a crystallinity of from about 2% to about 50%.

8. The improvement of claim 7 wherein the crystallinity is from about 3% to about 15% and the polymer is neutralized with an ion selected from Groups IA, IIA, IIB elements and ammonium.

9. The improvement of claim 8 wherein the polymer coating has a thickness of from about 1 to about 100 microns.

* * * * *